United States Patent [19]
Shinmoto

[11] Patent Number: 5,116,211
[45] Date of Patent: May 26, 1992

[54] APPARATUS FOR CONTROLLING THICKNESS OF FILM FORMED BY MELT EXTRUSION

[75] Inventor: Jitsumi Shinmoto, Tokyo, Japan

[73] Assignee: Tomi Machinery Manufacturing Co., Ltd., Japan

[21] Appl. No.: 501,157

[22] Filed: Mar. 29, 1990

[30] Foreign Application Priority Data

Mar. 30, 1989 [JP] Japan .................. 1-76617
Mar. 27, 1990 [JP] Japan .................. 2-75749

[51] Int. Cl.$^5$ ........................... B29C 47/22
[52] U.S. Cl. .................. 425/141; 264/40.2; 425/143; 425/466
[58] Field of Search ............. 425/141, 143, 466; 264/40.2, 40.6

[56] References Cited

U.S. PATENT DOCUMENTS

| | | | |
|---|---|---|---|
| 3,940,221 | 2/1976 | Nissel | 425/141 |
| 4,425,290 | 1/1984 | Upmeier | 425/141 |
| 4,514,348 | 4/1985 | Iguchi et al. | 425/171 |
| 4,726,752 | 2/1988 | Van Dun | 425/141 |
| 4,753,587 | 6/1988 | Djordjevic et al. | 425/141 |
| 4,781,562 | 11/1988 | Sano et al. | 425/141 |
| 4,882,104 | 11/1989 | Dobrowsky | 425/141 |
| 4,886,438 | 12/1989 | Börger et al. | 425/141 |

FOREIGN PATENT DOCUMENTS 58-29624 8/1981 Japan .

OTHER PUBLICATIONS

*Kirk-Othmer Concise Encyclopedia of Chemical Technology*, New York: John Wiley & Sons, Inc. 1985, pp. 236-240, 1159-1161.

Primary Examiner—Jay H. Woo
Assistant Examiner—W. J. Matney, Jr.
Attorney, Agent, or Firm—Davis, Bujold & Streck

[57] ABSTRACT

An apparatus for controlling the thickness of a film molded by a melt extruding method provided with a plurality of cooling means for cooling the vicinity of a die lip close to a plurality of heating means and with many grooved holes in which the heating means are embedded and provided with air holes at the both ends thereof, whereby the temperature can be freely adjusted to the high and low set values in a short period of time, by which the time loss and material loss can be reduced.

11 Claims, 4 Drawing Sheets

APPARATUS FOR CONTROLLING THICKNESS OF FILM FORMED BY MELT EXTRUSION

BACKGROUND OF THE INVENTION

1. Field of the Invention

The present invention relates to an apparatus for controlling the thickness of a synthetic resin film in which upon the formation of a film by a melt extrusion method, ununiformity in thickness of the film is eliminated and controlled so as to make the thickness of the film uniform or the thickness of the film can be locally controlled as required.

2. Related Background Art

Upon the formation of a film by discharging molten resin from a die lip and gradually thinning the thickness of the film, it is well known in the art that in order to eliminate the ununiformity in thickness of the film, temperature distribution of the lip is varied to thermally control the same.

As an example of the above, there has been proposed an apparatus in which many heaters are provided around the lip, the heating power of each of the heaters is varied to locally adjust the heating amount to the resin by which fluidity and extensibility of the resin is changed to adjust the ununiformity in thickness of the film.

The concrete contents thereof are decribed in detail in Japanese Patent Application Nos. 63-143694 and 63-143695 which have been filed by the applicant of the present application.

In a film molding die used in the execution of the above mentioned method, the heating power of each of the electric heaters provided around the lip is varied in accordance with the degree of the ununiformity in thickness of a finished film to eliminate the ununiformity in thickness of the film or to adjust the film thickness. However, there is a tendency that heating-up with the use of the electric heaters is attained easier than cooling-down.

That is, the film thickness should be adjusted and controlled such that in order to make the film thickness thinner, the temperature of a part of the die lip which forms the thick part of the film is increased, while in order to make the film thickness thicker, the temperature of a part of the die lip which forms a thin part of the film is decreased.

In the above mentioned case, in order to rapidly increase the temperature of the die lip, a large amount of power can be applied to the heaters. However, in order to rapidly decrease the temperature of the die lip, what can be done is to turn off the heaters to minimize the heating amount thereof.

Therefore, there is a difference between the increase in temperature of the die lip and the decrease in temperature of the die lip in responsiveness and easiness.

In addition, the heat capacity of the film molding die is great, so that simply through natural cooling, it takes much time to lower the temperature of the die lip to make the film thickness uniform and a time lag in response to heat leads to an industrial loss.

Further, even when only a heater to be controlled is completely turned off, in a case that other heaters around the heater concerned are turned on under the normal control, it takes much time for the heater to be controlled to cool down to a predetermined set temperature influenced by the temperature values of the other heaters therearound.

In a case that the temperature is automatically adjusted with relative temperature to make the film thickness uniform, the increase in temperature is attained easier than the decrease in temperature, so that the set temperature will be gradually increased and hence the temperature of the entire die will be also increased sometimes beyond the appropriate temperature range for molding, which causes a failure to mold the film in the worst case.

SUMMARY OF THE INVENTION

According to the present invention, in a film molding die in which the heating powers of a plurality of heating means which are provided in the vicinity of a die lip are separately controlled to change the temperature distribution of an edge of the die lip, thereby controlling the thickness of a film, a plurality of cooling means for cooling the vicinity of the die lip are provided on the die close to the heating means, a plurality of grooved holes in which the heating means are embedded are provided close to the die lip, and air holes which are opened toward the outside of the die are provided at both ends of the grooved holes such that one of the air holes is connected to the cooling means, thereby solving the above mentioned problems associated with the prior art.

Air is vented to the air holes pierced in the die, by which the inside of the die lip is forcedly cooled, so that the responsiveness to the control to lower the temperature can be improved and stable constant temperature control can be realized.

BRIEF DESCRIPTION OF THE DRAWINGS

FIG. 3 is a schematic diagram showing the structure of a film thickness controllable melt extruding type film molding apparatus to which the present invention is applied such as an inflation film molding apparatus or the like;

DETAILED DESCRIPTION OF THE PREFERRED EMBODIMENTS OF THE INVENTION

Next, the preferred embodiments of the present invention will be described with reference to the accompanying drawings.

Figure 1:
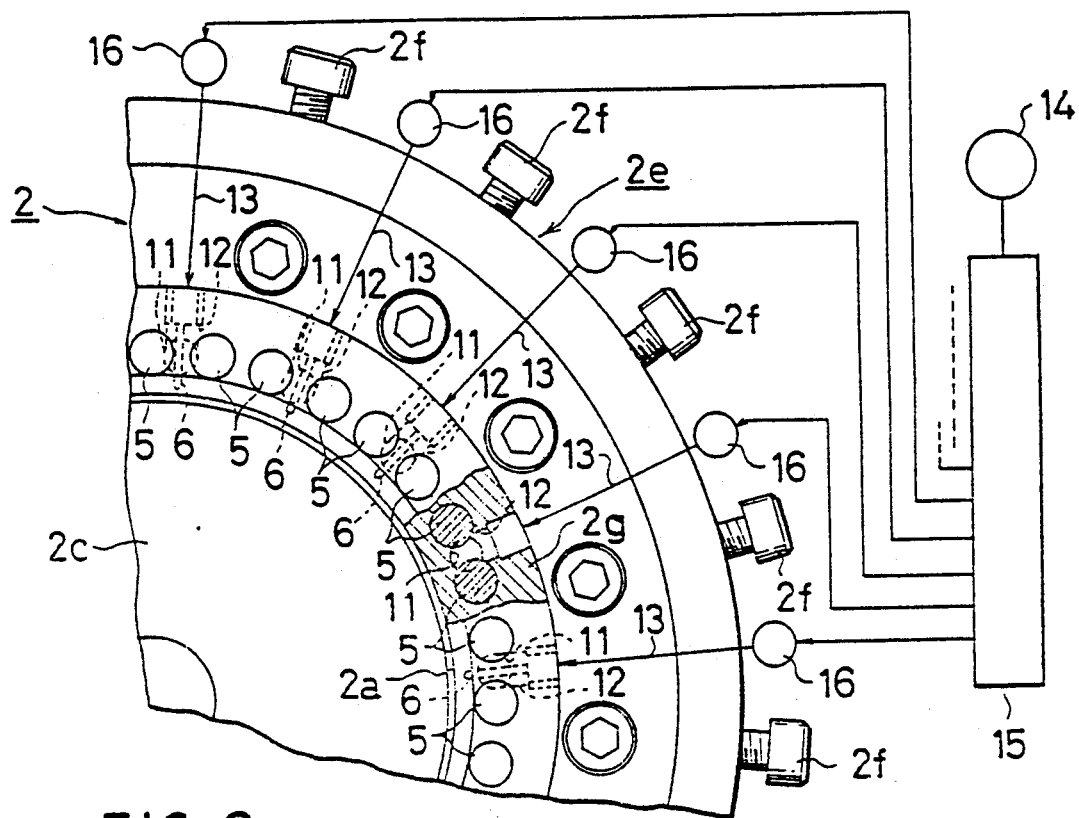
FIG. 1 is a plan view showing a quarter part of a die lip according to one embodiment of the present invention.
Figure 2:
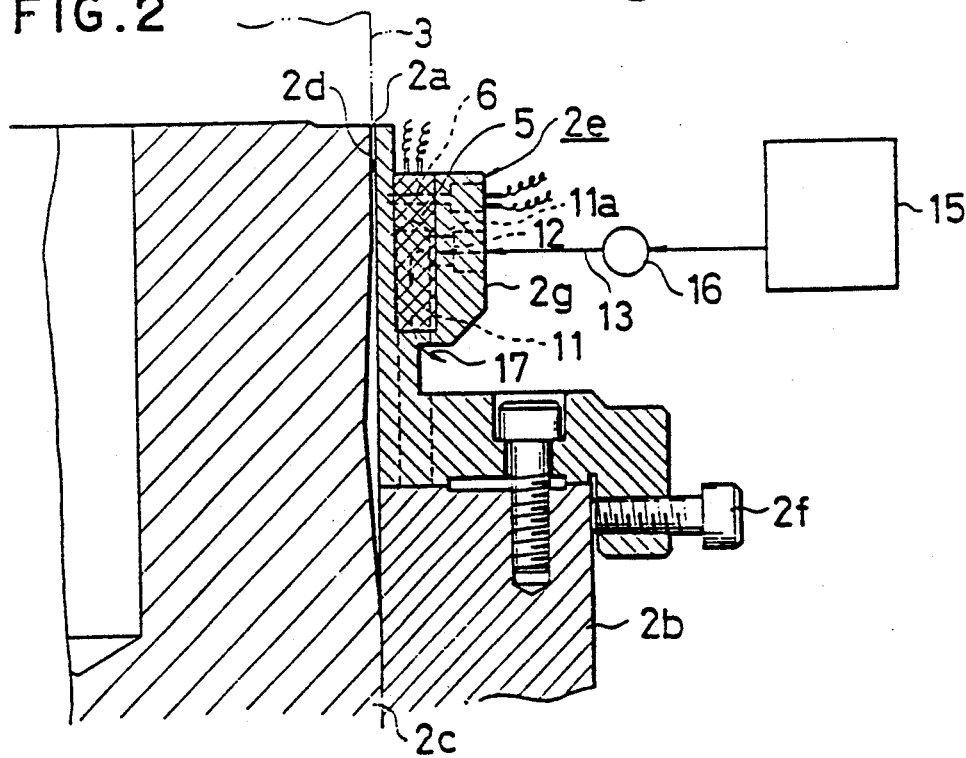
FIG. 2 is a longitudinal sectional view showing the relation between heating element and temperature measuring (thermometric) element in FIG. 1.
Figure 3:
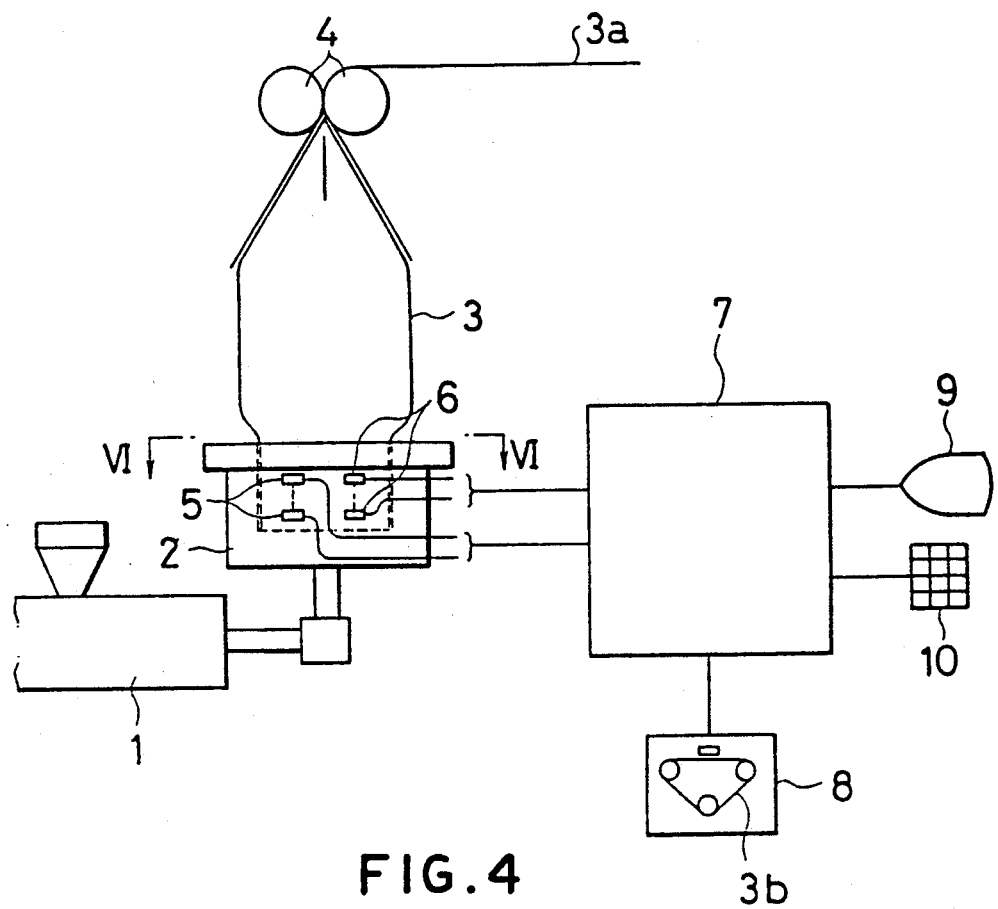
Figure 4:
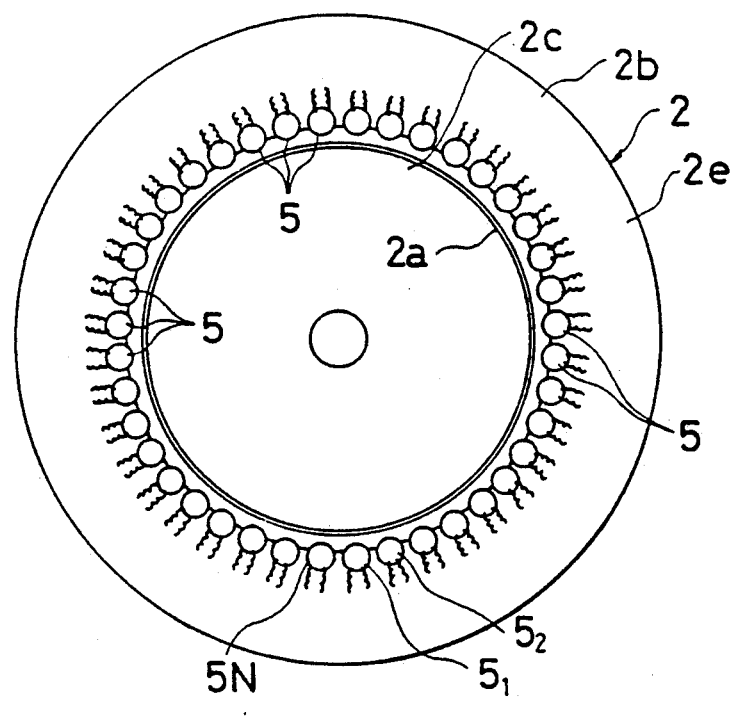
FIG. 4 is a sectional view taken along the line IV—IV in FIG. 3.

FIGS. 1 and 2 show one embodiment of the present invention. FIGS. 3 and 4 are schematic diagrams of a film thickness controllable melt extruding type film molding apparatus to which the present invention is applied such as an inflation film molding apparatus or the like.

First, the structure of an inflation film molding apparatus which is capable of adjusting the film thickness will be briefly described with reference to FIGS. 3 and 4.

In the drawings, (1) denotes an extruder; (2), a film molding die; (3), a film which is pulled out of the die (2); (4), a nip roll for pulling out the film (3); (5), a plurality of heating elements which are provided around a die lip (2a) in pairs close to the die lip (2a) of the die (2); and (6), a plurality of temperature measuring (thermometric) elements adapted to measure the temperature of the vicinity of the plurality of heating elements.

(7) denotes an arithmetic unit adapted to control the heating power from each of the heating elements (5) as required.

The arithmetic unit (7) is provided on the periphery thereof with a film thickness measuring unit (8) adapted to measure the thickness of a finished film (3a) prepared by cooling the film (3) down to a predetermined temperature and then folding the film by the nip roll (4) into a flat state and to input data on the measurement to the arithmetic unit (7), a monitor unit (9) adapted to display predetermined data in the arithmetic unit (7) or to display predetermined indication, and a key unit (10) adapted to input predetermined function codes and numeric data into the arithmetic unit (7).

The heating powers of the heating elements (5) can be individually controlled. In the embodiment, ceramic sheath type electric heaters are used as the heating elements. The heating elements (5) are provided on the outer periphery of the annular die lip (2a) densely close to one another.

FIG. 1 is a detailed plan view of a quarter part of the die lip (2a) according to one embodiment of the present invention.

The temperature measuring elements (6) are provided between the heating elements (5) (5) which are provided in pairs to measure the temperature of the vicinity of the individual heating elements (5).

FIG. 2 is a longitudinal sectional view along the axis of the die (2) showing the relation between the heating elements (5) and the temperature measuring elements (6) in the vicinity of the die lip (2a) in FIG. 1.

A mandrel (2c) is fitted into the center of a die body (2b) of the die. Lip adjusting rings (2e) are fitted on the outer periphery of an upper end (2d) of the mandrel spaced from one another.

An air ring (not shown) for air cooling the film (3) (which is referred to as bubbled in case of the inflation molding) pulled out of the die lip (2a) is provided on an outside upper part of the lip adjusting ring (2e).

In this connection, it is to be noted that in the inflation molding, although there are provided inside mandrel for generating the internal pressure of the bubbles, bubble guide for guiding the bubbles along the outer periphery and the like, these elements are not directly related to the present invention, so that the figuring and description thereof are omitted.

The lip adjusting ring (2e) is aligned with the mandrel (2c) by an adjusting screw (2f) to uniformly adjust the intervals between the die lips (2a) over the full arc of the mandrel.

The individual heating elements (5) are embedded in the lip adjusting rings (2e) close to the die lips (2a) of the lip adjusting rings (2e) along the axis of the die (2).

The temperature measuring elements (6) are also embedded in the lip adjusting rings (2e) between the paired heating elements (5) (5). As the temperature measuring element (6), a thermo-electric couple, a platinum resistor or any other thermo-sensitive element may be employed. In this embodiment, the thermo-electric couple is employed.

An air hole (11) which is coaxial with the paired heating elements (5) (5) is pierced directly under the temperature measuring element (6) between the paired heating elements (5) (5). The upper end (11a) of the air hold (11) terminates directly under the temperatures measuring element (6).

The lower end of the air hole (11) is opened sideward in a position which is lower than the lower end of the heating element (5) and at the lower root of an upper flange (2q) of the lip adjusting ring (2e).

The upper end (11a) of the air hole (11) communicates with an air hole (12) which is pierced so as to extend from the outer peripheral surface of the upper flange (2q) to the air hole (11) at right angles and an air pipe (13) is connected to the air hole (12).

The air pipe (13) is also connected to an accumulator (15) for accumulating therein air compressed by a compressor (14) through an adjusting valve (16).

The adjusting valve (16) adjusts the amount of air flowing from the accumulator (15) into the air holes (11) and (12).

The air (17) fed into the air holes (11) and (12) comes into contact with heated walls of the air holes (11) and (12) to act as a coolant for cooling the die. A side portion of the heating element (5) is exposed within the air hole (11), so that the heating element (5) is also cooled with the air (17) passing through the air hole (11).

As a result, the temperature around the die lip (2a) rapidly responds to the heating power of the heating element (5), so that if a predetermined target temperature is set to the temperature measuring element (6), the temperature of the die lip (2a) will be rapidly fixed under the control of the heating power of the heating element (5).

In addition, according to the present invention, in order to change the temperature of the die lip (2a), it is also possible to change the degree of cooling of the air hole (11).

For example, the adjusting valve (16) may be constituted by an automatic controlling valve to electrically control the amount of air flowing into the air hole (12) and to perform feedback control on the temperature measuring element (6) so as to maintain the predetermined target temperature.

As an alternative, a blast amount controllable blast fan may be connected to each of the air holes (12) such that the amount of blast can be fed back and controlled based on the measured value by the temperature measuring element (6).

Further, according to the present invention, both the amount of heating by the heating element (5) and the amount of air through the air-hole (11) can be controlled to adjust the thickness of the film.

OTHER EMBODIMENTS

The embodiment in which the configuration of the lip formed by the inflation film molding is annular has been described above. In addition, the present invention is also applicable to a T die (20) by which a film is shaped into a sheet form as shown in FIGS. 5 and 6.

A die lip (21) of the T die (20) is constructed such that the thickness of resin discharged from a manifold (25) can be variably controlled by a fixed lip bar (23) fixed to a die main body (22) and a movable lip bar (24) which is fine-adjustably provided on the die main body (22).

The T die (20) can restrict the thickness of the film by the same thickness adjusting method as that shown in FIGS. 3 and 4. In this case, a heating element (26) which is the same as the heating element (5) in FIG. 3 is embedded in either of the fixed lip bar (23) or the movable lip bar (24) to control the temperature distribution of the die lip (21) in the width direction.

Figure 5:
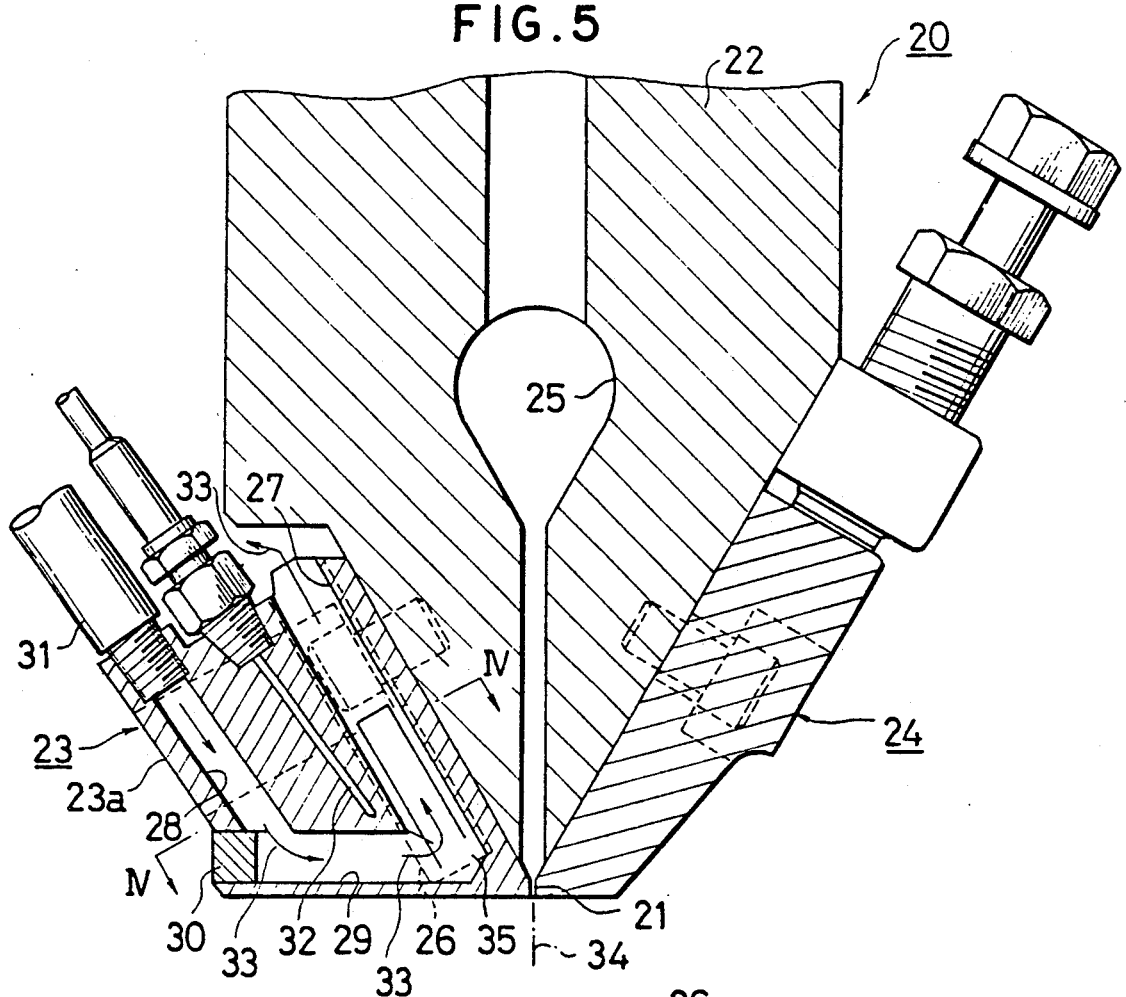
FIG. 5 is a longitudinal sectional view showing the essential part of a T die according to another embodiment of the invention.
Figure 6:
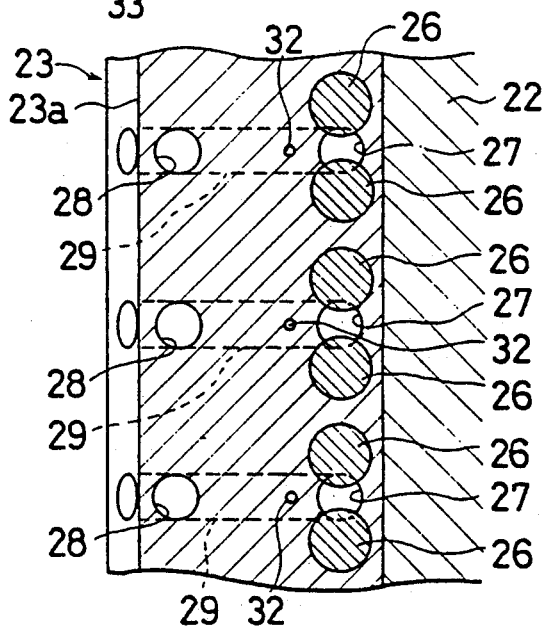
FIG. 6 is cross sectional view taken along the line VI—VI in FIG. 5.

In the embodiment shown in FIGS. 5 and 6, many heating elements (26) are embedded in the fixed lip bars (23) at regular intervals in the direction of the width of the film.

An air hole (27), the axis thereof being in parallel with a direction in which the film is pulled out, is provided between the adjacent paired heating elements (26)(26).

The lower part of the hole (27) extends down to a position in which it comes near the die lip (21).

An air hole (28), the axis thereof being in almost parallel with the axis of the air hole (27), is provided in the fixed lip bar (23) near an outside surface (23a) of the bar outside of the air hole (27). The lower ends of the air holes (27) and (28) are communicated with each other through an air hole (29) which is horizontally pierced from the outer surface (23a) of the bar (23).

The outer surface (23a) of the horizontal air hole (29) is closed by a plug (30).

An air pipe (31) is coupled to the upper end of the outer air hole (28).

A temperature measuring element (32) is embedded in a somewhat outer position in the inner air hole to measure a mean temperature between the two heating elements (26) and (26).

Thus, cold air (33) is fed from the upper end of the outer air hole (28) through the air pipe (31) as a coolant. The air (33) passes through the air holes (27), (28) and (29) to locally cool down one side surface of the die lip (21).

The air discharged from the upper end of the air hole (27) blows upward along a side surface of the die and hence has no influence on the stream of films (34) which are pulled out downward from the die lip (21).

In the above mentioned embodiment, a communication section (35) between the air holes (27) and (29) is bent at an acute angle in a position which is the closest to the die lip (21). As mentioned above, a portion of the section at which air current changes its orientation at an acute angle exhibits great heat exchanging effect, so that a portion of the die lip (21) is locally well-cooled.

In case of the above mentioned T die, the cooling means can be readily provided on the both fixed lip bar (23) and movable lip bar (24) which are provided on the both sides of the die lip (21) corresponding to the both surfaces of the film.

In this connection, it is to be noted that even when a lip for molding an inflation film is annular in configuration, a cooling means is sometimes provided on the lip side at the upper end of the mandrel. It is also possible to provide the cooling means on the both sides of the die lip corresponding to the both surfaces of the film as required.

FIGS. 7 to 10 show another embodiments in which the present invention is applied to the inflation film molding apparatus which is the same as that shown in FIGS. 1 and 2.

In this connecton, it is to be noted that in FIGS. 7 to 10, like numerals denote like parts as in FIGS. 1 and 2 and hence the description thereof is omitted.

Figure 7:
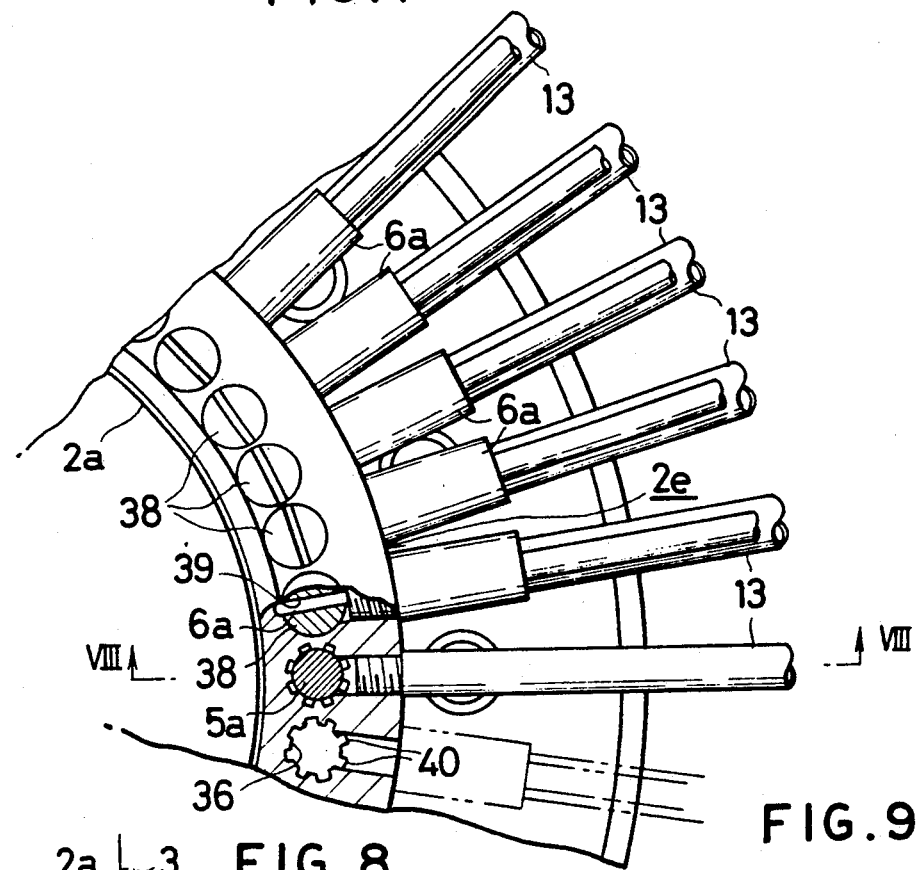
FIG. 7 is a plan view showing the essential part of an inflation film molding die according to a further embodiment of the invention.

FIG. 7 is a detailed plan view showing a part of the die lip according to another embodiment of the present invention.

Many heating elements (5a) and temperature measuring elements (6a) are provided around the die lip (2a) in pairs in a vertical direction.

Figure 8:
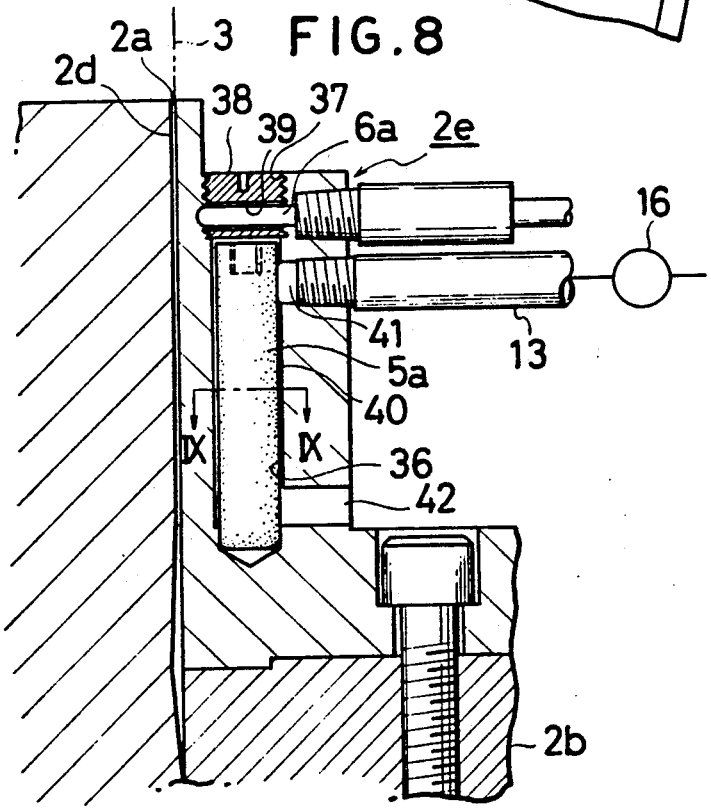
FIG. 8 is an enlarged longitudinal sectional view taken along the line VIII—VIII in FIG. 7.

As shown in FIG. 8, the heating element (5a) is embedded in a hole (36) so provided as to come near the die lip (2a) and an opening (37) of the hole (36) is closed by a screw cap (38). The screw cap (38) is provided therein with a hole (39) passing therethrough a direction orthogonal to the axis thereof and the temperature measuring element (6a) passes through the hole (39) in the screw cap (38) over the heating element (5a) and comes into abutment against the lip adjusting ring (2e) in a portion on which is the closest to the wall of the die lip (2a).

Figure 9:
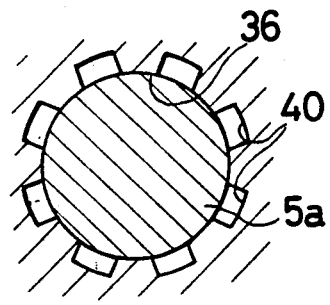
FIG. 9 is an enlarged sectional view of a hole in which a heating element is to be embedded.

As shown in FIG. 9, many grooves (40) are provided along the axis of the hole (36) in the circumferential surface of the hole (36) in which the heating element (5a) is to be embedded. As shown in FIG. 8, air holes (41) and (42) are pierced at the upper and lower ends of the hole (36) from the outer surface of the lip adjusting ring (2e) and the air pipe (13) is connected to the upper air hole (41).

Therefore, air which is fed from the air pipe (13) into the hole (36) in which the heating element (5a) is embedded passes through the grooves (40) and is discharged to the outside through the lower air hole (42).

When the air passes through the grooves (40), the air comes into contact with the outer periphery of the heating element (5a) and with the lip adjusting ring (2e) to cool down the both.

In particular, the outer periphery of the heating element (5a) is uniformly cooled, so that no partial variation of heating temperature is induced and hence stable heating can be attained.

Figure 10:
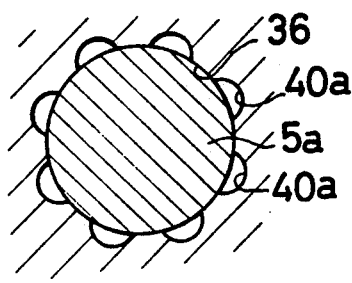
FIG. 10 is an enlarged cross sectional view of another hole in which a heating element is to be embedded.

FIG. 10 shows another embodiment of the groove (40) in the hole (36) in which the heating element (5a) is embedded shown in FIG. 9.

The bottom of the groove (40) shown in FIG. 9 is square, while the bottom of a groove (40a) shown in FIG. 10 is semicircular.

In the embodiments shown in FIGS. 7 to 10, the heating elements (5a) and the temperature measuring elements (6a) are provided with one-to-one correspondence, so that the lip temperature within a local narrow range can be accurately controlled, and the entire of one heating element (5a) is cooled to improve the responsiveness to the controlled temperature.

In the above mentioned embodiments, air is used as the coolant of the cooling means. As an alternative, gas other than air, or water or other liquid, or a mist of gas and liquid may be employed.

As has been described above, according to the present invention, the temperature can be freely adjusted to the high and low set values with almost the same ease.

In addition, the temperature can be adjusted to the set value in a short period of time, so that time loss and material loss can be reduced.

The present invention has beeen described in relation to the preferred embodiments thereof. However, the present invention is not limited thereto and various other changes and modifications may be made within the scope of the appended claims.

What is claimed is:

1. In a film molding die having extruding means and a die lip in which a plurality of individually controlled elongate heating elements, each defining a longitudinal axis, are provided to heat the die lip and cooling means are provided for cooling the die lip, the heating elements and the cooling means being provided to adjust the temperature distribution of the die lip thereby to assist in controlling the thickness of a film manufactured by the film molding die, the improvement wherein the cooling means comprises a plurality of air channels each having a plurality of longitudinally extending grooves, at least a longitudinal exterior surface of each heating element is in fluid communication with a longitudinal portion of at least one of said plurality of air channels, each of said plurality of air channels extending substantially parallel to the axis of the heating element with which it is in fluid communication, and the longitudinal exterior surface of each heating element at least partially forms an interior surface of the air channel with which it is in fluid communication.

2. In a film molding die having extruding means and a die lip in which a plurality of individually controlled elongate heating elements, each defining a longitudinal axis, are provided to heat the die lip and cooling means are provided for cooling the die lip, the heating elements and the cooling means being provided to adjust the temperature distribution of the die lip thereby to assist in controlling the thickness of a film manufactured by the film molding die, the improvement wherein the cooling means comprises a plurality of air channels, at least a longitudinal exterior surface of each heating element is in fluid communication with a longitudinal portion of at least one of said plurality of air channels, each of said plurality of air channels extending substantially parallel to the axis of the heating element with which it is in fluid communication, and the longitudinal exterior surface of each heating element at least partially forms an interior surface of the air channel with which it is in fluid communication, wherein the heating elements are provided in pairs and one of said plurality of air channels is located between each said pair of heating elements and a longitudinal exterior surface of each of the said pair of heating elements at least partially forms the interior surface of the air channel positioned therebetween.

3. In a film molding die according to claim 1, wherein each heating element is concentrically disposed and closely received within one of said plurality of air channels.

4. In a film molding die according to claim 1, wherein one of said plurality of channels is coaxial with a said heating element.

5. In a film molding die according to claim 1, wherein an air pipe intersects each air channel at a right angle and the air pipes are connected to air supply means for supplying air to the air channels.

6. In a film molding die according to claim 5, wherein an air valve is positioned between each air pipe and the air supply means to adjust the air flow to each individual air channel.

7. In a film molding die according to claim 1, wherein the molding die further includes a temperature control system, and the heating elements are ceramic sheath type electric heaters positioned adjacent and outlet of the die lip, the electric heaters are connected to the control system for inputting temperature control information thereto.

8. In a film molding die according to claim 1, wherein the temperature measuring elements are provided adjacent the heating elements to measure the temperature of the die lip.

9. In a film molding die according to claim 8, wherein the temperature measuring elements are thermo-electrically coupled platinum resistors.

10. In a film molding die according to claim 2, wherein each one of said plurality of air channels comprises first, second and third air channel portions, each having first and second open ends and each defining a longitudinal axis, the longitudinal axis of the first and third air channels are parallel to one another and the second end of the first air channel is connected to the first end of the second channel and the second end of the second air channel is conencted to the first end of the third air channel with the longitudinal axes of the second and third air channel portions forming an acute angle therebetween to facilitate mixing of air with an interior surface of the second and third air channels, as air flows therethrough thereby to increase the cooling of the die lip adjacent the second and third air channels, and the first end of the first channel communicates with air supply means supplying cooling air with the air channels while second end of the third channel exhausts the supplied air 11. In a film molding die having extruding means and a die lip in which a plurality of controlled elongate heating elements, extending along a longitudinal axis, are provided to heat the die lip and cooling means are provided for cooling the die lip, the heating elements and the cooling means being provided to adjust the temperature distribution of the die lip thereby to assist in controlling the thickness of a film manufactured by the film molding die, the improvement wherein the cooling means comprises a plurality of air channels each having a plurality of longitudinally extending grooves with an inlet and an outlet, at least a longitudinal exterior surface of each heating element being in fluid communication with a longitudinal portion of one of said plurality of air channels, the longitudinal portion of one of said plurality of air channels extending substantially parallel to the longitidunal axis of the heating element with which it is fluid communication, air supplying means, for supplying air to the inlets of said plurality of air channels such that said air supply means intersects each of said plurality of air channel at a right angle, and temperature control means being provided for controlling heating elements and said air supply means and thereby controlling the temperature of the die lip.

* * * * *